US006104998A

United States Patent [19]

Galand et al.

[11] Patent Number: 6,104,998

[45] Date of Patent: Aug. 15, 2000

[54] SYSTEM FOR CODING VOICE SIGNALS TO OPTIMIZE BANDWIDTH OCCUPATION IN HIGH SPEED PACKET SWITCHING NETWORKS

[75] Inventors: Claude Galand, La Colle sur Loup; Gerald Lebizay, Vence; Jean Menez; Bernard Pucci, both of Cagnes-sur-Mer; Gerard Richter; Michele Rosso, both of Saint Jeannet, all of France

[73] Assignee: International Business Machines Corporation, Armonk, N.Y.

[21] Appl. No.: 09/213,505

[22] Filed: Dec. 17, 1998

[30] Foreign Application Priority Data

Mar. 12, 1998 [EP] European Pat. Off. .............. 97480102

[51] Int. Cl.[7] .............................. H04J 3/22; G10L 19/08

[52] U.S. Cl. .......................... 704/500; 704/219; 370/352; 370/389

[58] Field of Search .................................... 704/500, 219; 370/352, 389, 229, 395

[56] References Cited

U.S. PATENT DOCUMENTS

| | | | |
|---|---|---|---|
| 3,742,145 | 6/1973 | Clark et al. | 370/505 |
| 4,763,319 | 8/1988 | Rozenblit | 370/397 |
| 4,965,789 | 10/1990 | Bottau et al. | 370/465 |
| 5,313,454 | 5/1994 | Bustini et al. | 370/231 |
| 5,751,718 | 5/1998 | Yip et al. | 370/468 |
| 6,047,007 | 4/2000 | Munday et al. | 370/545 |

*Primary Examiner*—David R. Hudspeth
*Assistant Examiner*—Daniel Abebe
*Attorney, Agent, or Firm*—Joscelyn G. Cockburn

[57] ABSTRACT

A system for coding voice signal to optimize bandwidth occupation in a High Speed Packet Switching network while ensuring best voice transmission quality.

The voice signal is first encoded using a conventional GSM like RPE/LTP coder providing first sub-frames of coded signal and tagging these first sub-frames as being non-discardable. In addition, a convenient difference between an RPE/LTP provided signal and a corresponding synthesized image is performed (see 36) and is also block encoded into second sub-frames which second sub-frames are tagged as being discardable sub-frames. Said second sub-frames when concatenated to corresponding first sub-frames provide so-called multirate frames. Then, when transmitting said multirate frames over the High Speed packet switching network, dropping discardable tagged data enables solution network congestion situations in any network node and at random with no significant disturbing effect over the voice communication operation.

17 Claims, 7 Drawing Sheets

(5a)

(5b)

SYSTEM FOR CODING VOICE SIGNALS TO OPTIMIZE BANDWIDTH OCCUPATION IN HIGH SPEED PACKET SWITCHING NETWORKS

This invention deals with a system for coding voice signals to optimize bandwidth occupation in packet switching communication networks, and more particularly for implementing said network optimization through use of improved multirate voice coding.

BACKGROUND ART

Modern digital networks are made to operate in a multimedia environment and interconnect, upon request, a very large number of users and applications through fairly complex digital communication networks.

Represented in FIG. 1 is an example showing the complexity of presently operating networks. Represented is a backbone network (100), e.g., an Asynchronous Transfer Mode (ATM) network, with multiple end users attached to said network. Some users are directly attached to the ATM network. Others are attached to the ATM network via an access network (102). As represented in FIG. 1, the system does operate in a multimedia environment by having to transport pure data as well as video and audio information, the latter being provided by PBX or CX (103) attached telephone user's, as well as being provided by base stations (104) relaying voice data provided by mobile telephone stations MS1, MS2, . . . (e.g., GSM terminals), via so-called Mobile Switch Centers (MSC) (105).

Accordingly, due to the variety of users' profiles and distributed applications, the corresponding traffic is becoming more and more bandwidth consuming, non-deterministic and requiring more connectivity. This has been the driver for the emergence of fast packet switching network architectures in which data, voice and video information are digitally encoded, chopped into fixed (in ATM mode of operation) or variable length (in so-called PTM mode of operation) packets (also named "cells in ATM networks), which packets are then transmitted through a common set of nodes (106, 107, . . . , 113) and links also named trunks, interconnecting said nodes to constitute the network communication facilities as represented in FIG. 1.

An efficient transport of mixed traffic streams on very high speed lines (herein also designated as links or trunks), means for these new network architectures, a set of requirements in terms of performance and resource consumption including a very high throughput and a very short packet processing time, a very large flexibility to support a wide range of connectivity options, an efficient flow and congestion control, congestion being a state in which the network performance degrades due to saturation of network resources such as communication links bandwidth, and processor cycles or memory buffers located within the nodes.

One of the key requirements for high speed packet switching networks is to reduce the end to end delay in order to satisfy real time delivery constraints when required and to achieve the necessary high nodal throughput for the transport of voice and video. Increases in link speeds have not been matched by proportionate increases in the processing speeds of communication nodes. The fundamental challenge for high speed networks is to minimize the processing time and to take full advantage of the high speed/low error rate technologies. Most of the transport and control functions provided by the new high bandwidth network architectures are performed on an end to end basis. Congestion must however be and actually is, challenged throughout the network by being monitored and controlled in the very network nodes.

One basic advantage of packet switching techniques (as opposed to so-called circuit switching techniques) is to allow statistical multiplexing of the different types of data over a same line which optimizes the transmission bandwidth. The drawback, however, is that packet switching introduces delays and jitters which might be detrimental for transmission of isochronous data, like video or voice. This is why methods have been proposed to control the network in such a way that delays and jitters are bounded for every new connection that is set-up across the packet switching network.

Methods for handling congestion have been described, for instance in a European Application published with number 0000706297 (Method for operating traffic congestion control in a data communication network and system for implementing said method). Said methods include, for any source end user also attached to the network, and requesting its data to be vehiculated over the network, establishing a path and setting a connection through the network high speed lines (links or trunks) and nodes, via an entry node port of said network, with optimal use of the available transmission bandwidth of the network down to indicated destination.

Obviously, due for instance to the very nature of any given source of traffic, a discrimination has to be made among the various traffic natures by assigning these, different specific priorities. In other words, qualities of service (QoS) are specified in terms of maximum delay ($T\_max$) and packet loss probability ($P\_loss$) upon a source terminal requesting being connected to a destination terminal via the network (i.e. at call set-up time) and based on the nature of the traffic provided by said involved source.

To that end, the QoS and traffic characteristics (e.g. peak rate, mean rate, average packet length) specified and agreed upon by both parties (source owner and network management) are used to compute the amount of bandwidth, i.e. equivalent capacity (Ceq) of the connection, to be reserved on every line on the route or path assigned to the traffic between source terminal and destination terminal, in order to guarantee a packet loss probability which is smaller than the loss probability ($P\_loss$) that has been specified for the connection. But, in operation, the fluctuating network traffic must be controlled dynamically which means that some packets shall be dropped within the network if this is required to avoid network congestion due to traffic jamming. While conversely additional bandwidth should be assignable to predefined connections as soon as bandwidth is freed.

In practice, it is common to reserve bandwidth for high priority packets (e.g. so-called Real Time (RT) traffic), derived from committed QoS traffic, which packets are transmitted in preference to lower priority packets derived from discardable traffic (e.g. Non Real Time (NRT) traffic or more particularly Non Reserved (NR) traffic). But still, for RT traffic, the largest the QoS, the better the quality of received voice or video information at the receiving end. Accordingly the traffic should be managed to dynamically take advantage of any bandwidth becoming available during network operation. This bandwidth can vary widely depending on the actual activity of the traffic sources. It is therefore of considerable importance to manage the traffic so as to optimize the use of the widely varying left-over bandwidth in the network while avoiding any congestion which would reduce network throughput. This obviously requires providing the network (and eventually also the sources) with congestion detection and flow control facilities. Several flow control mechanisms do exist. These mechanisms are implemented in the so-called network nodes.

As already known in the art of digital communication, and disclosed in several European Applications (e.g. Publication Number 0000719065 and Application Number 95480182.5) each network node basically includes input and output adapters interconnected via a so-called node switch. Each adapter includes series of buffers or shift registers where the node transiting packets are stored. Traffic monitoring is generally operated via preassigned buffer threshold(s) helping monitoring shift register queues, as shall be described with reference to following figures.

FIG. 2 represents a switching node made according to the art. It includes so-called receive adapters (20) which provide interfaces to the input lines (trunks) numbered 1 through N, and so-called transmit adapters (22) providing output interfacing means to the switching node output lines/trunks numbered 1 through N. In practice however receive and transmit adapters might be combined into a single adapter device and be implemented within a same program controlled processor unit. A switching fabric (24) (also herein referred to as "switch") in charge of the communications between input and output adapter means, is also provided.

The switching fabric includes input router means for scanning the receive adapters and feeding output address queues through a shared memory . A control section is also provided to control the operation of both the shared memory and the output address queues.

As shown in FIG. 2, the incoming packet is stored in a switch input queue (SIQ) (25) located in the receive adapter (20) which SIQ is served at a switch rate, via a routing device (26). We assume here that the switch is an Asynchronous Transfer Mode (ATM) switch, capable of switching ATM and variable length packets. The packet routing header contains one bit to indicate whether a packet is an ATM packet or a variable length packet. Whenever a packet is of variable length type, it is segmented by the receive switch interface RSI into ATM cells upon servicing by the switch input queue SIQ. Then the cells obtained by the segmentation are switched to the transmit adapter where they are finally reassembled into the original packet by the transmit switch interface XSI. Of course, ATM cells are switched natively.

At the transmit adapter of a preferred embodiment of this invention, the packet is enqueued in one of three possible queues, according to its priority. As already mentioned, possible traffic priorities are defined as real-time (RT), non-real-time (NRT), or non-reserved (NR). Typically, the highest priority class (RT) is used to transport voice or video signals, the second class (NRT) is used to transport interactive data, and the third class (NR) is used for file transfer. The real-time RT may itself include traffics of different priority levels (RT1, RT2, etc . . . ). Upon request from the transmit line, a scheduler (27) serves the transmit adapters queues. This means that, at every request for a new packet, the scheduler (27) first looks at the real-time queue and eventually serves a real-time packet. If this queue is empty, then the scheduler (27) looks at the non-real-time queue and eventually serves a non-real-time packet. The non-reserved queue is served only when both real-time and non-real-time queues are empty.

From a cost efficiency standpoint, the network bandwidth occupation should be optimized, but due to the random nature of any network traffic this goal is far from being easy to achieve. As already mentioned, a number of systems are available in the field which help monitoring the traffic and dynamically modulating bandwidth assignment under network operating conditions. In other words, should any congesting conditions be detected along any network path (connection), several mechanisms have been developed not only to identify the perturbing connection, but also to solve the congestion problem by selecting data packets to be simply dropped. This has been achieved by discriminating between so-called committed traffic whose delivery is guaranteed and so-called discardable traffic and by tagging these traffics accordingly to help selecting packets droppable in network nodes as required.

Non discardable packets are tagged as "green" tagged packets while discardables ones are said "red" tagged packets. Tagging is performed by using one specified bit of each packet header. In other words, excess traffic may be allowed to enter the network as long as this traffic may be identified throughout the followed network path and dropped if necessary.

At first glance, the above traffic regulating system should not raise, from technical standpoint, too many problems when applied to Non-Real-Time (NRT) or Non Reserved (NR) Traffic. But this is not the case with Real Time (RT) traffic, like video or voice (speech) originating traffic. Packets of NRT and NR traffics may be retransmitted when they have been dropped within the network as long as a convenient mechanism is provided within the network to identify lost packets, which is actually the case in most networks. But, such a solution is inoperable over real-time traffic, for obvious reasons. This explains why real-time traffic has been assigned the highest priority. However, due to the exploding requirements for supporting real-time traffic like video or voice/speech increasing traffic, while providing the transport services with highest possible quality of coded voice signal, the problem has been raised and a number of solutions looked for. One of these is based on so-called multirate coding of voice signals.

Obviously, the above architectured networks are already adapted to multirate operation over source users' data. This would be particularly convenient for voice sources, which even though they have been assigned the highest priority, may still benefit from the network organization as is.

While the QoS was negotiated for voice traffic, it was still limited to ensure cost efficiency of the network operation. Additional bandwidth may be assigned to voice connections in order to improve decoded speech quality, where said bandwidth becomes available, as long as said additional bandwidth might be suppressed, at random, in case of congestion without disturbing the voice coding operations.

Accordingly, knowing how exploding is the present demand for voice traffic over digital networks (including Internet) one shall appreciate the value of efficient voice/speech coders enabling good multirate operation over presently available high speed packet switching networks. The highest rate would then be admitted by the network, as long as one could switch, at random, to the lower rate during network congestion.

Some multirate coders are already available as disclosed for instance in U.S. Pat. Nos. 4,912,763 or 4,589,130. Such coders provide a packetized data frame, organized to enable varying the transmission rate by simply dropping portions of said frame. This coder may thus be used within a packet switching network. But the frame splitting within network nodes would be rather complex to control, from a software standpoint.

This solution would then not be suitable on cost efficiency basis. Other known multirate coding schemes would simply not support random switching from one rate to another in any network node.

OBJECTS OF THE INVENTION

One object of this invention is to provide an improved multirate voice coder suitable for being used in presently available high speed packet switching networks.

Another object of this invention is to provide a system for digitally encoding voice signals to enable optimizing bandwidth utilization in available high speed packet switching networks fairly simply.

Another object of this invention is to provide a system particularly suitable for use in presently operating high speed packet switching networks providing means for discriminating between discardable and non discardable packets.

Still another object of this invention is to provide a system for digitally encoding voice signals to enable optimizing bandwidth occupation in the Internet network.

A further object of this invention is to provide a system to enable an improved multirate encoding suitable for the Global System for Mobile (GSM) telephone.

A still further object of this invention is to provide a multirate voice encoding system with which random switching from one rate of operation to another would not disturb decoding operations.

Another object of this invention is to provide a multirate voice encoder with a good Signal-to-Noise Ratio at higher rate as well as convenient noise shaping improving subjective quality of received voice signal.

A further object of this invention is to provide a voice coder with stable multirate voice encoding operation.

Another object of this invention is to provide a high speed packet switching network using multirate voice coding and enabling switching from one rate to another, at random, within said network without affecting the voice coding operations.

The foregoing and other objects features and advantages of this invention will be made apparent from the following more particular description of a preferred embodiment of the invention as illustrated in the accompanying drawings.

DETAILED DESCRIPTION OF A PREFERRED EMBODIMENT OF THE INVENTION

Figure 1:
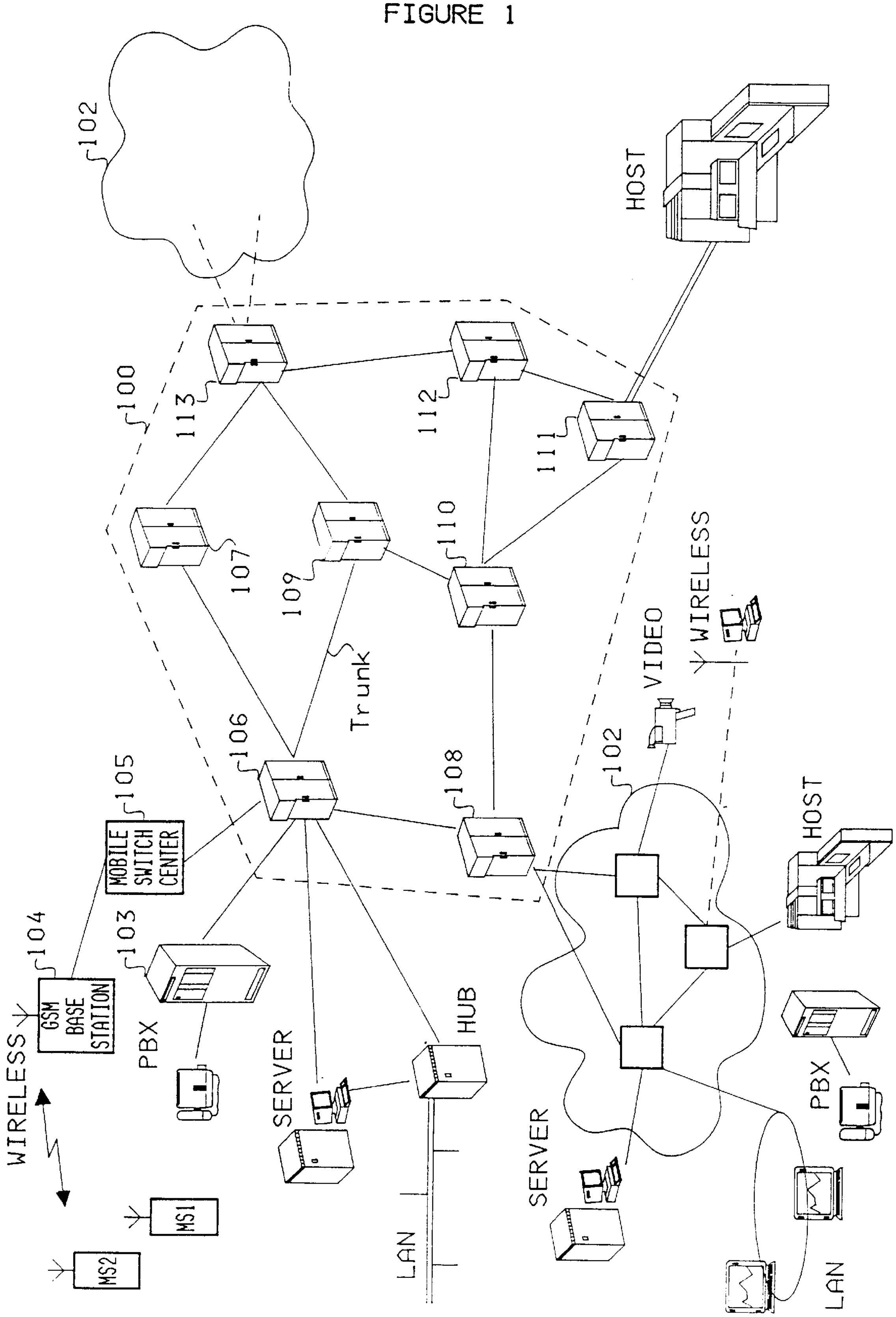
FIG. 1 is a representation of a high speed packet switching network wherein the invention should be applicable.

As already mentioned, the existing high speed digital network nodes (see FIG. 2) have been designed to optimize network bandwidth occupation by enabling dynamic regulation of flow traffic. To that end, the nodes have been provided with flow control systems for controlling committed traffic with guaranteed delivery to the connected user, and for controlling so-called excess traffic which might be discarded. Should the connection path suffer congestion at any moment, means are known to adjust the bandwidth assigned to said excess traffic. In that case, if necessary, packets belonging to said excess traffic might be discarded.

This kind of network architecture should enable multirate speech transmission without any significant modification of the network, as long as the speech coder used enables building up output frames of coded signal which could be split into discardable frame portions and non-discardable frame portions. Another requirement is that random packet discarding throughout the network should not affect the quality of received and decoded voice signal at the destination end-user location.

Several publications might be cited wherein multirate coders are disclosed. One may, for example, note:

Proceeding of IEEE International Conference on Acoustics Speech and Signal Processing, Boston, Apr. 14–16, 1983 vol. 3, pp 1284–1287, IEEE, New York, US; C. R. Galand et al “Multirate Sub-Band Coder with Embedded Bit Stream: Application to Digital Tasi”

Proceedings of IEEE International Conference on Acoustics, Speech and Signal Processing, Tampa, Mar. 26–29, 1985, vol. 4, pp 1680–1683, IEEE, New-York, US; J.H Derby et al.: “Multirate Sub-Band Coding Applied to Digital Speech Interpolation”.

U.S. Pat. No. 4,912,763, assigned to IBM, inventors C. Galand and M. Rosso, “Process for Multirate Encoding Signals and Device for Implementing Said Process”.

The latter reference describes a multirate coder which would suit the present invention. But best quality of the decoded signal would then be obtained when coding at 16 or 24 Kbps. Given the present trend of the GSM market, as well as link bandwidth cost, the invention should focus on lower coding rates (e.g. 12 Kbps). This is why coders as used for GSM are preferably considered herein. These include the so-called “Regular Pulse Excited” (RPE) and “Code Excited Linear Prediction” (CELP) when combined with Long Term Prediction (LTP).

Both types of coders might be modified and improved to enable operating in multirate with no perturbation of the received decoded signal in case of random switching from one predefined rate to the other. Basically this is due to the fact that these kinds of coders do provide synthesized “images” of the coded signal which enables adding to the basic coded signal to be transmitted by the conventional RPE/LTP or CELP/LTP, a coded signal representing the difference between the transmitted and received signals, i.e. an error signal.

While applying equally to RPE/LTP, CELP/LTP or MPE/LTP family of coders, the preferred embodiment of this invention shall be described with reference to the RPE/LTP. But for information on the CELP one may refer to U.S. Pat. No. 4,933,957 assigned to IBM with title “Low Bit Rate Voice Coding Method and System”; inventors F. Bottau, C. Galand, J. Menez and M. Rosso.

For references on RPE, one may refer to:

“Regular Pulse Excitation—A novel Approach to Effective and Efficient Multipulse Coding of Speech”, published by P. Kroon et al in IEEE Transactions on Acoustics, Speech and Signal Processing, Vol. ASSP-34, No 5, October 1986, p 1054 and following.

ICASSP 88, wherein further improvement was achieved by including the RPE coder within a feedback loop performing Long Term Prediction operations on the signal to be submitted to RPE processing. "Speech Coder for the European Mobile Radio-system", by P. Very, K. Holling, R. Holman, R. Sluyter, C. Galand and M. Rosso.

Figure 3:
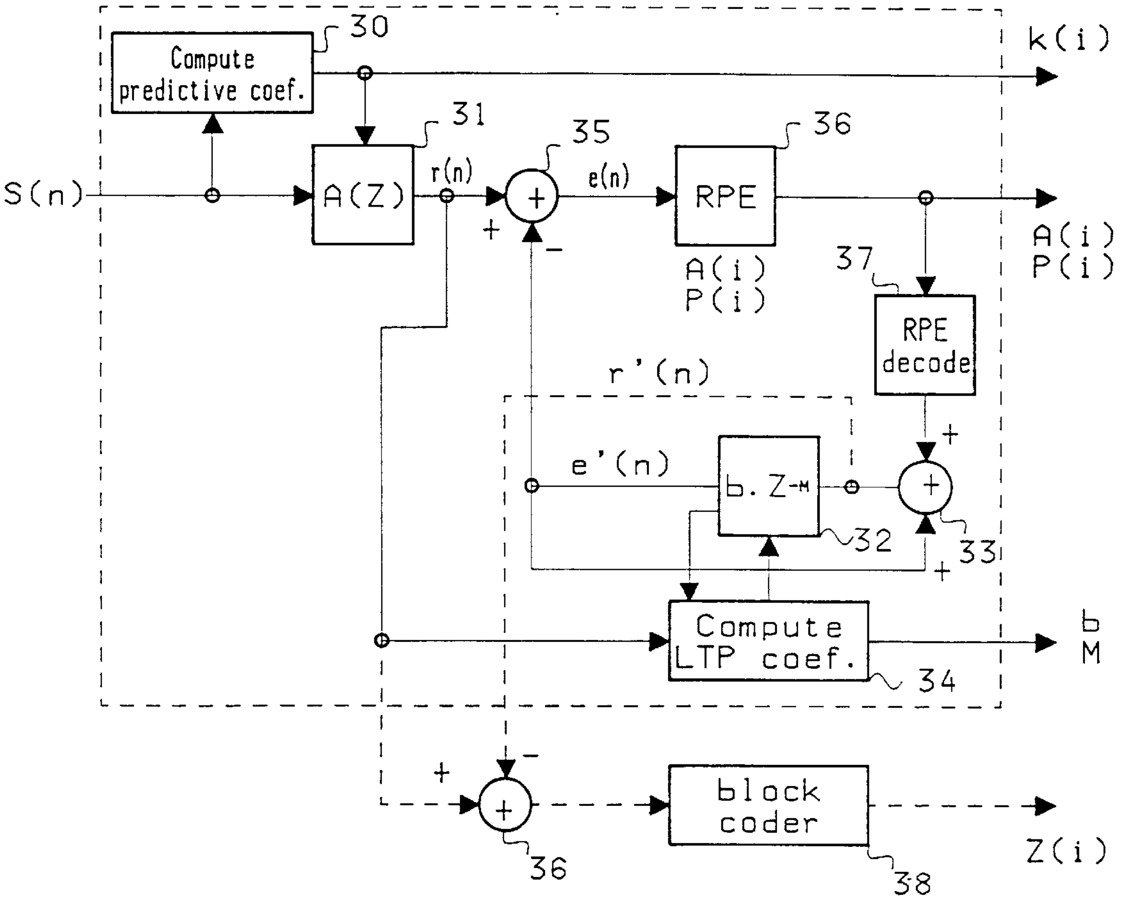
FIGS. 3 and 4, respectively, represent the Coder and Decoder made according to this invention.

A block diagram of the RPE/LTP coder is represented in FIG. 3 (see dashed lines on GSM coder). The original speech signal sampled at 8 KHz and PCM encoded S(n) is analyzed for short term prediction in a device (30) computing so-called partial correlation (PARCOR) related coefficients ki. Said PARCOR coefficients are computed according to the Leroux-Gueguen algorithm as disclosed in "A Fixed Point Computation of Partial Correlation Coefficients" IEEE Trans., Acoust., Speech and Signal Processing, ASSP-25 pp 257–259 (June 1977).

These ki coefficients are converted into filter coefficients Ai which are used to tune an optimal short prediction filter A(z)(31). The resulting short term residual signal r(n) is then analyzed by Long Term Prediction (LTP) into an LTP filter loop including a so-called RPE decoder (37), a filter (32) with a transfer function $b.z^{-m}$ in the z domain, and an adder (33). b and M are respectively a gain coefficient and a pitch related coefficient. Both b and M are computed in a device (34), an efficient implementation of which has been described in European Application 87430006.4. The M value is a pitch harmonic selected to be larger than forty r(n) samples intervals.

The Long Term Prediction loop is used to synthesize an estimated (or predicted) residual signal e"(n) to be subtracted from the input residual signal r(n) into a device (35) providing an error residual signal e(n). Regular Pulse Excitation (RPE) coding operations are performed in a device (36) over fixed length consecutive blocks of samples (e.g. 40 samples or 5 ms long) of said signal e(n). Conventionally, said RPE coding involves converting each e(n) sequence into a lower rate sequence (i.e. down sampled sequence) of regularly spaced samples. The e(n) signal is, to that end, low-pass filtered into y(n) and then split into at least two down sampled sequences $e_1(n)$ and $e_2(n)$. Typical toll quality RPE operating at 12 Kbps considers for each low-pass filtered 5 ms long sequence of residual samples (e(n)); n=0, . . . 39) the selection of one out of three sub-sequences:

$$e_1(n) = y(3n) \qquad n = 0, \ldots, 13$$

$$e_2(n) = y(3n+1) \quad n = 0, \ldots, 12$$

$$e_3(n) = y(3n+2) \quad n = 0, \ldots, 12$$

The sub-sequence selection is made on the basis of an energy criterion, according to:

$$E(i) = \underset{n=0}{\overset{12}{SUM}}(e_i(n))^2 \quad \text{for } i = 1, 2, 3$$

select j such that $$E(j) = \underset{i=1}{\overset{3}{\mathrm{MAX}}}(E_{(i)}).$$

The sub-sequence $e_j(n)$ with the highest energy is supposed to best represent the e(n) signal. For further information on RPE coding operations, one may refer to the article "Regular Pulse Excitation, a Novel Approach to Effective and Effident Coding of Speech", published by P. Kroon et al in IEEE Transaction on Acoustics Speech and Signal Processing, Volume ASSP 35, N°5, October 1986. The samples of the selected sequence are quantized using Block Companded PCM (BCPCM) techniques quantizing each block of samples into a characteristic term A(i) and a sequence of quantized values P(i) with reference to an addressed table of the RPE sequence.

The RPE decoder (RPE 37) performs the inverse operations to reconstruct an image e'(n) of the original error residual signal e(n). It includes Block dequantizing means providing sequences of samples which are over sampled back to the original e(n) rate. Such over sampling may be performed by inserting zeros between consecutive dequantized samples.

In summary, the speech coded signal has been converted into a set of PARCOR coefficient k(i) describing the locutor vocal tract, Long Term Prediction filtering parameters b,M, and A(i), P(i) representing the quantized samples of the selected data sequence and a parameter identifying said selected sequence.

All these data are multiplexed and used in this invention to define a first sub-frame of the coded signal at a first given rate which shall represent the non-discardable traffic. The second rate shall be generated by concatenating to the said first sub-frame a second sub-frame representing the increment between the RPE/LTP effectively coded signal image and the best image of the original voice signal. The resulting concatenated frame will represent the coded speech at highest rate (i.e. highest bandwidth required) minimizing coding error. The final target of the invention is set to get a system stable with most convenient signal-to-noise ratio, so that, in the worst case, should network congestion occur and switching from one predefined transmission rate to another rate be randomly operated anywhere within the network, the received decoded speech would, at least be at the original RPE/LTP quality with no unrecoverable incidence on the decoding at receiving network end.

A basic advantage of Predictive coders family is that the feedback loop already provides a number of synthesized images of corresponding original signals. These include the synthesized long term residual e(n) provided by RPE decoder (37), the synthesized short term residual r'(n) provided by adder (33) and also a synthesized coded speech signal s'(n) which could be obtained by inverse filtering r'(n) through a filter 1/A(z) (not shown in the figure).

Accordingly the speech coding quality of GSM "like" coders (i.e. looped predictive coders) might be improved by coding additionally (s(n)–s'(n)), (e(n)–e'(n)) or (r(n)–r'(n)) to generate the above mentioned second sub-frame to be concatenated to the GSM original frame after being "red" tagged. But since, this second sub-frame should be discardable at any level of a given connection throughout the communication network (i.e. in any node along the assigned path), this removal should not affect coding/decoding schemes.

Let's first consider the first alternative, i.e. coding the signal (s(n)–s'(n)). This means first generating a decoded speech signal s'(n).

Figure 4:
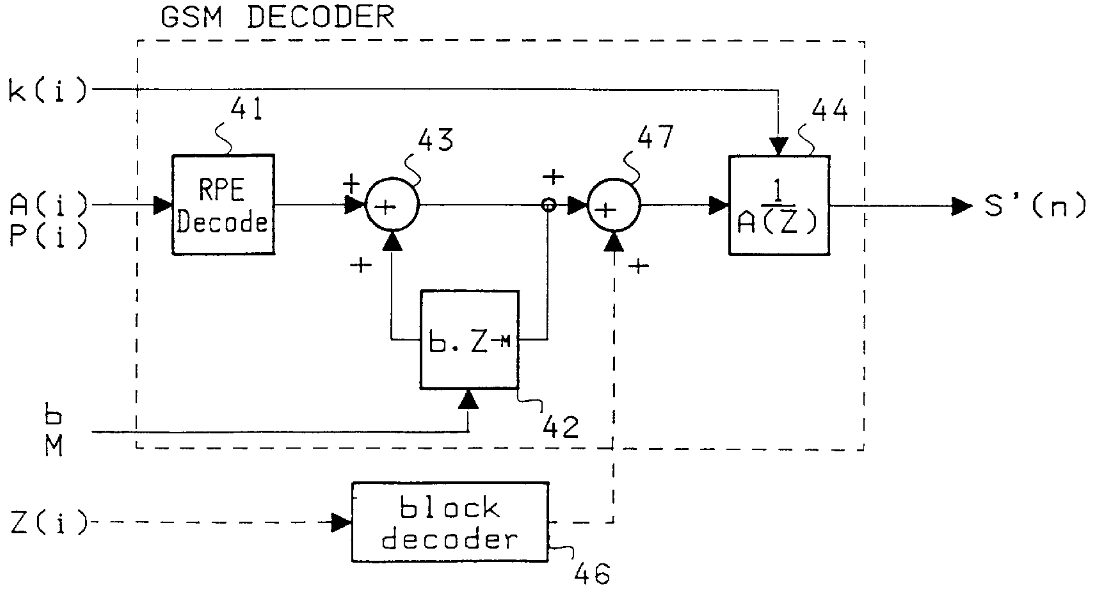

The GSM RPE/LTP decoder is represented in FIG. 4. It shows that A(i) and P(i) are first fed into an RPE decoder device (41) converting A(i) and P(i) into an error signal i.e. a synthesized residual signal e'(n). As already disclosed, the RPE decoder should include block dequantizing means and oversampling means to bring the sampled signal back to its original sampling frequency. Said error signal is then fed into a Long Term Predictive filtering loop including a filter (42) generating a long term error e"(n) (i.e. a prediction residual) which is added in (43) to e'(n) to provide r'(n). This last information needs then being filtered into an inverse filter (44) the transfer function of which is in the z domain, 1/A(z), that is, performing the inverse function of device (31) of the coder.

One may notice that all these devices are already available in the coder of FIG. 3, but for the device 1/A(z). In order to get s'(n) at the coding level, one needs thus only connecting an inverse filtering device 1/A(z) at the output of adder (33). Then (s(n)–s'(n)) may be generated and coded into any conventional Block Coder to get the additional discardable information to be "red" tagged. But a spectral analysis has shown that the coding noise in that case would look like a white noise (see FIG. 5*a* wherein spectral density of signal (X(Θ)) and the corresponding Coding noise (q(Θ)) have been represented). The power spectral density of said noise is rather disturbing and affects the received signal quality. The best mode of implementation of the present invention has therefore not been selected with (s(n)–s'(n)) for the above developed reasons.

Another solution may be considered which involves coding (e(n)–e'(n)) to get the red taggable data looked for. This implementation was discarded for eventually leading to an unstable system since the local decoder state and the remote decoder state (decoder at the destination user location) might be different.

As shown in FIG. 3, the third solution involving (r(n)–r'(n)) was considered best. Both signals are available locally. Then (r(n)–r'(n)) generated by adder (36) is fed into any type of Block Coder (38), e.g. a BCPCM coder generating coded data z(i) which shall constitute the above mentioned discardable data (the so-called "red taggable data). Conversely, the decoder as described above with reference to FIG. 4, shall just require a Block decoder (46) for decoding z(i), and an adder (47) for adding the decoded z(i) prior to performing the inverse filtering operations in (44).

Figure 5:
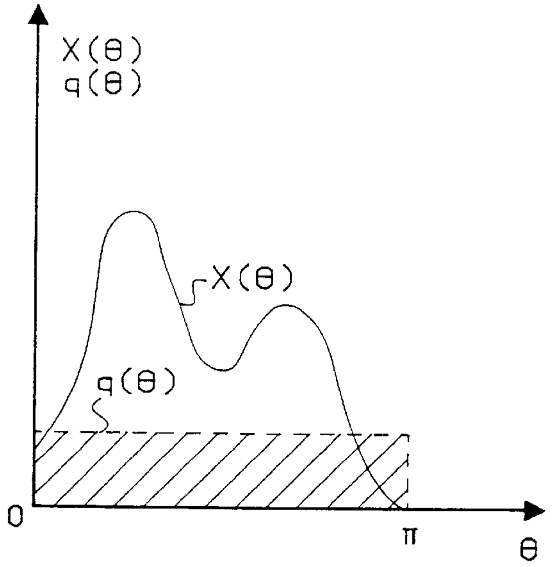
FIG. 5 shows noise spectral distributions to illustrate coding properties.
Figure 5:
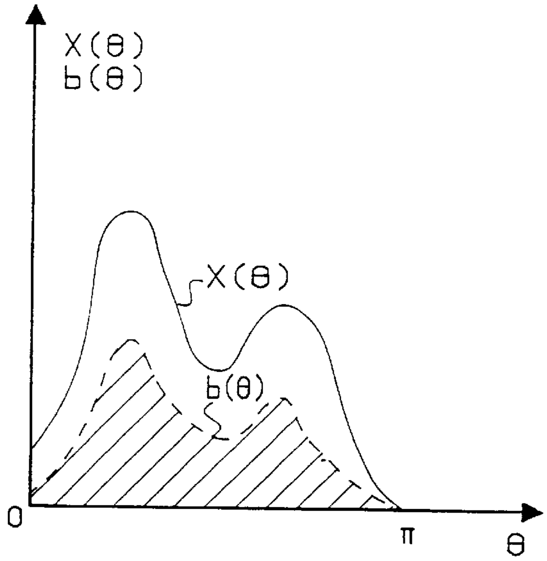

Not only the system would be stable and support any discarding of red tagged data without much inconvenience but in addition the resulting coding noise (b(θ)) would be shaped according to the power spectral density of (r(n)–r'(n)), as represented in FIG. 5*b*. This noise shaping would mean spectrally marked noise and less disturbing effect on the decoded signal received by the destination user i.e. remote user attached to a High Speed packet switching Network used for transporting the coded voice signal from origin to destination.

In order to transport the resulting voice traffic over the network of FIG. 1, one needs only, conventionally multiplexing the data issuing from the so-called RPE/LTP, then packetizing the multiplexing flow and "green" tagging each packet (e.g. by setting a predefined bit at "1"). In addition, the data Z(i) issuing from the Block Coder (37) are packetized and "red" tagged by setting the preassigned tag bit to zero.

Figure 6:
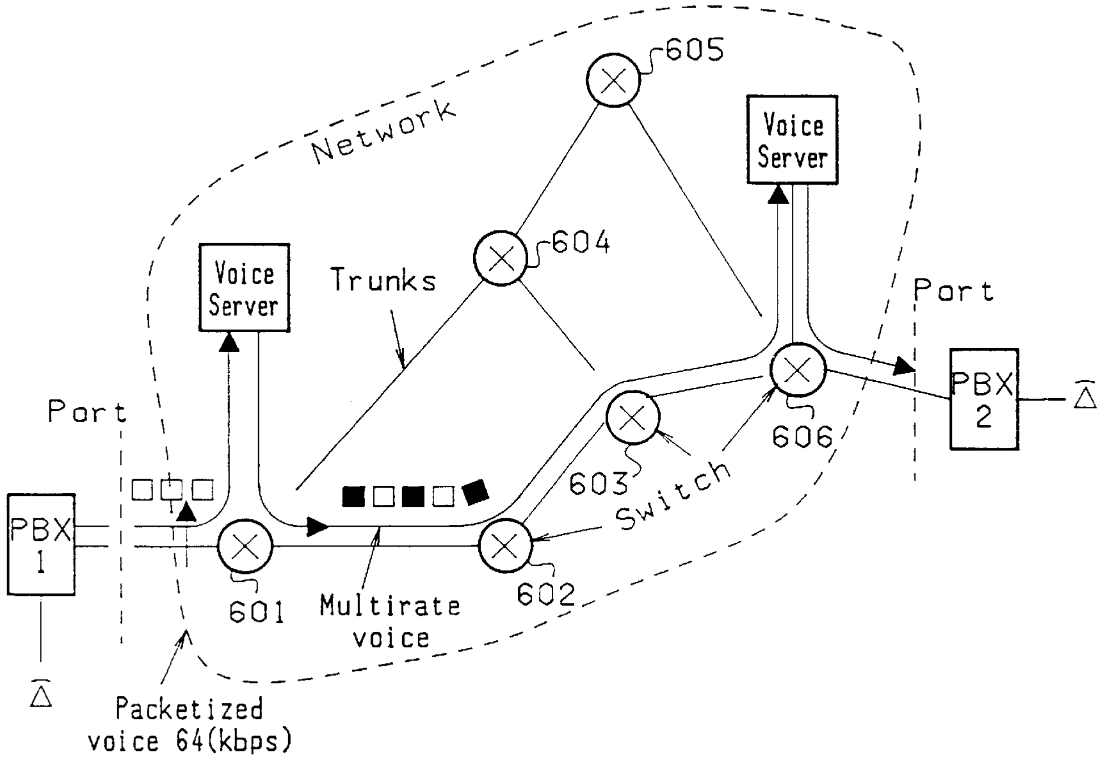
FIG. 6 shows the application of the selected voice coding schemes to a high speed packet switching network.

Then, to implement the invention over PBX or CX (60) provided speech signals, a voice server shall be added to the network as represented in FIG. 6. This figure shows an ATM network similar to network (100) of FIG. 1, and including conventional nodes (601) through (606). PBX1 and PBX2 are attached to nodes (601) and (606) respectively. Voice Server 1 and Voice Server 2 are also attached to nodes (601) and (606) respectively.

Assume PCM encoded voice data at 64 Kbps are provided to the entry node (601) via a port (not shown). These data would then be switched by node (601) toward Voice Server 1 including a multirate RPE/LTP coder/decoder as represented in FIGS. 3 and 4. The Voice Server shall then provide multirate packetized/compressed voice data including basic RPE/LTP packets (green tagged) at low bit rate of the order of 12 Kbps, concatenated with red tagged packets at 16 Kbps representing the Block Coded Z(i) data. Assuming the connection between PBX1 and PBX2 considered herein has been set-up via intermediate nodes (602) and (603). Then Voice Server 1 output, feedback to node (601) would be switched as represented in FIG. 6, toward nodes (602), (603) and (606). The latter node first orients the data flow toward Voice Server 2 wherein it is converted back (decoded) into its original form as 64 Kbps data frame fedback to node (606) to be then provided to PBX2 and down to destination user.

Figure 2:
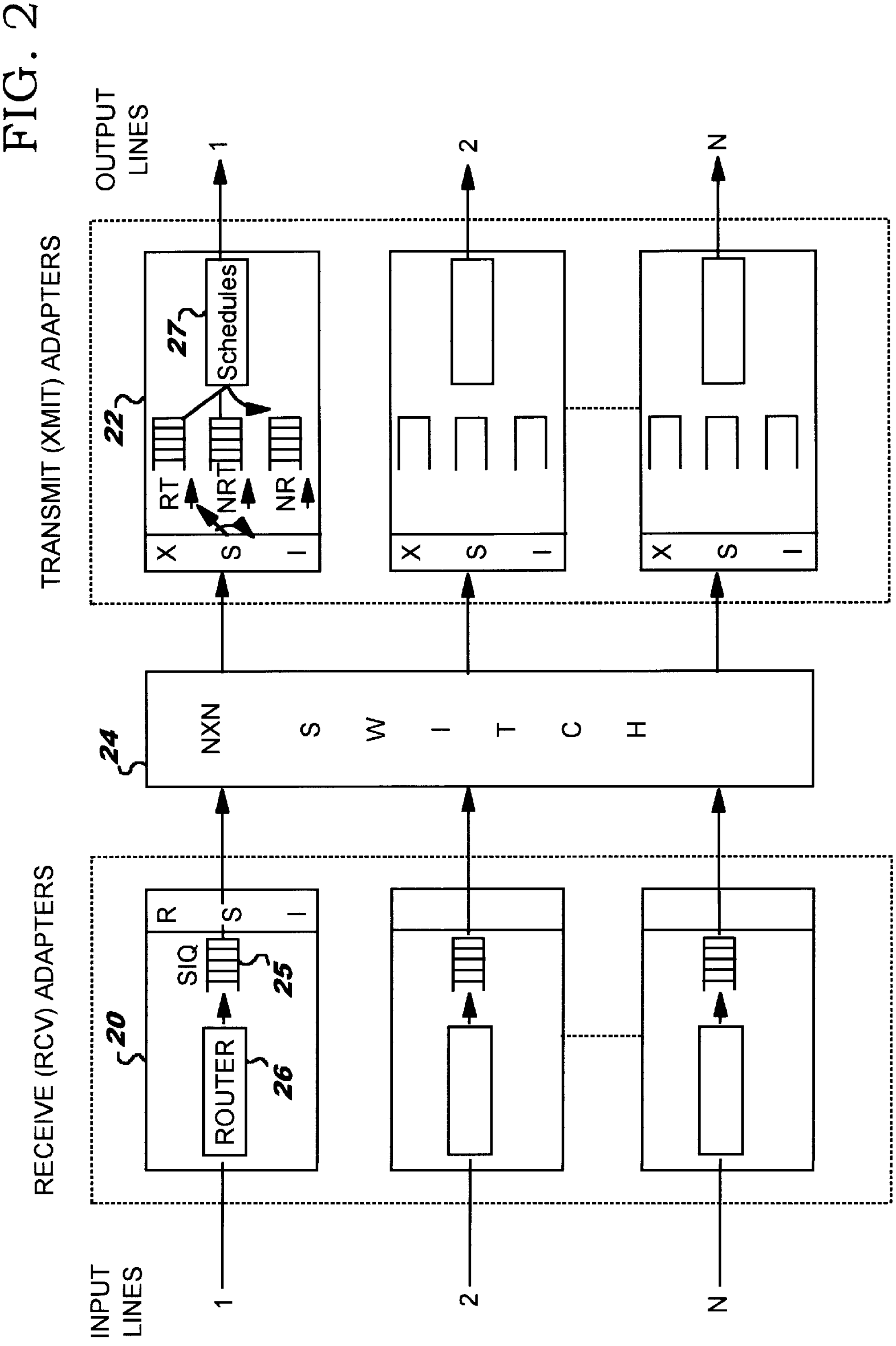
FIG. 2 is a representation of a network node showing the various devices used for controlling data flow.
Figure 7:
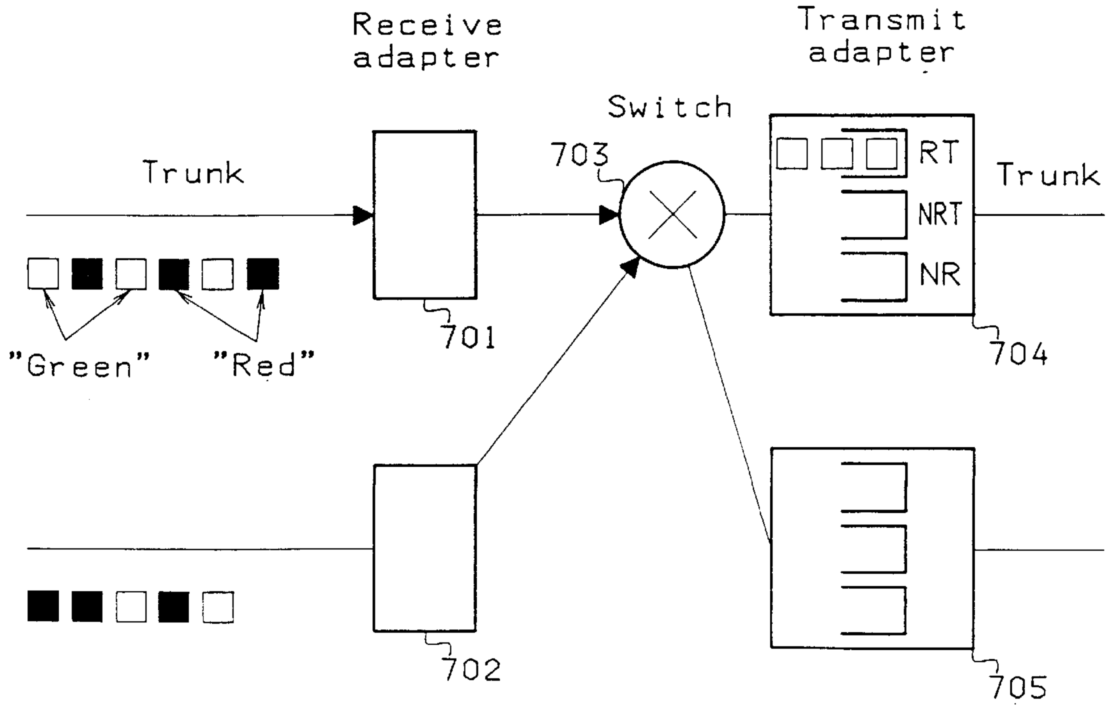
FIG. 7 illustrates a network node operation.

Conventional switching in intermediate nodes (602) and (603) as explained with reference to FIG. 2 is illustrated in FIG. 7. This figure represents, schematically, two receive adapters (701) and (702) each attached to an input trunk vehiculating both "green" and "red" tagged packets. A conventional node Switch (703) is used to orient the considered data toward corresponding transmit adapters (704) and (705) provided with queuing means including, Real Time (RT) queues to store the considered speech data traffic therein. Output trunks are connected to the transmit adapters to vehiculate the data traffic towards next network node along the selected path. But prior to launching the Real Time ffic, the flow shall be regulated therein to avoid congestion.

Figure 8:
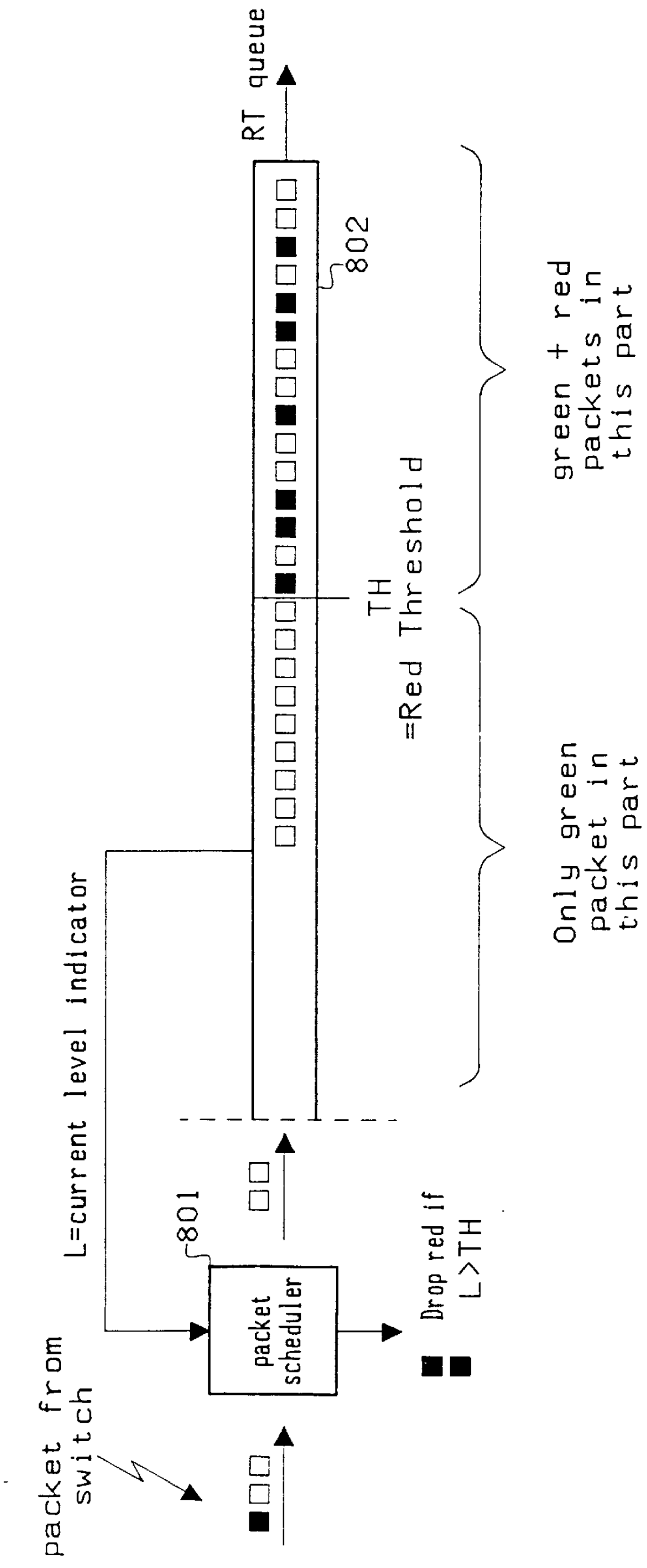
FIG. 8 shows the network congestion regulation mechanism using the invention.

Represented in FIG. 8 is a mechanism used to perform flow regulation. It includes a Packet Scheduler (801) receiving the packets from the switch and shifting these into the RT queue (802). This shift register is provided with a so-called "red" threshold level (TH) indication based on the predefined QoS assigned to the connection. The RT queue is also provided with means for monitoring the current queue level (L) and provide a corresponding indication back to the Packet Scheduler (801). Then, as soon as L is higher than the predefined threshold TH, the Packet Scheduler simply drops so-called "red" tagged packets and therefore feeds only "green" packets into the RT queue (802). In other words, "red" tagged packets may be dropped/discarded and voice coding may switch from highest (e.g. 28 Kbps) to lowest rate (e.g. 12 Kbps), at random, in any node along the selected path between PBX1 and PBX2 in case a predefined congestion situation be detected in a node along the network set-up voice path.

Figure 9:
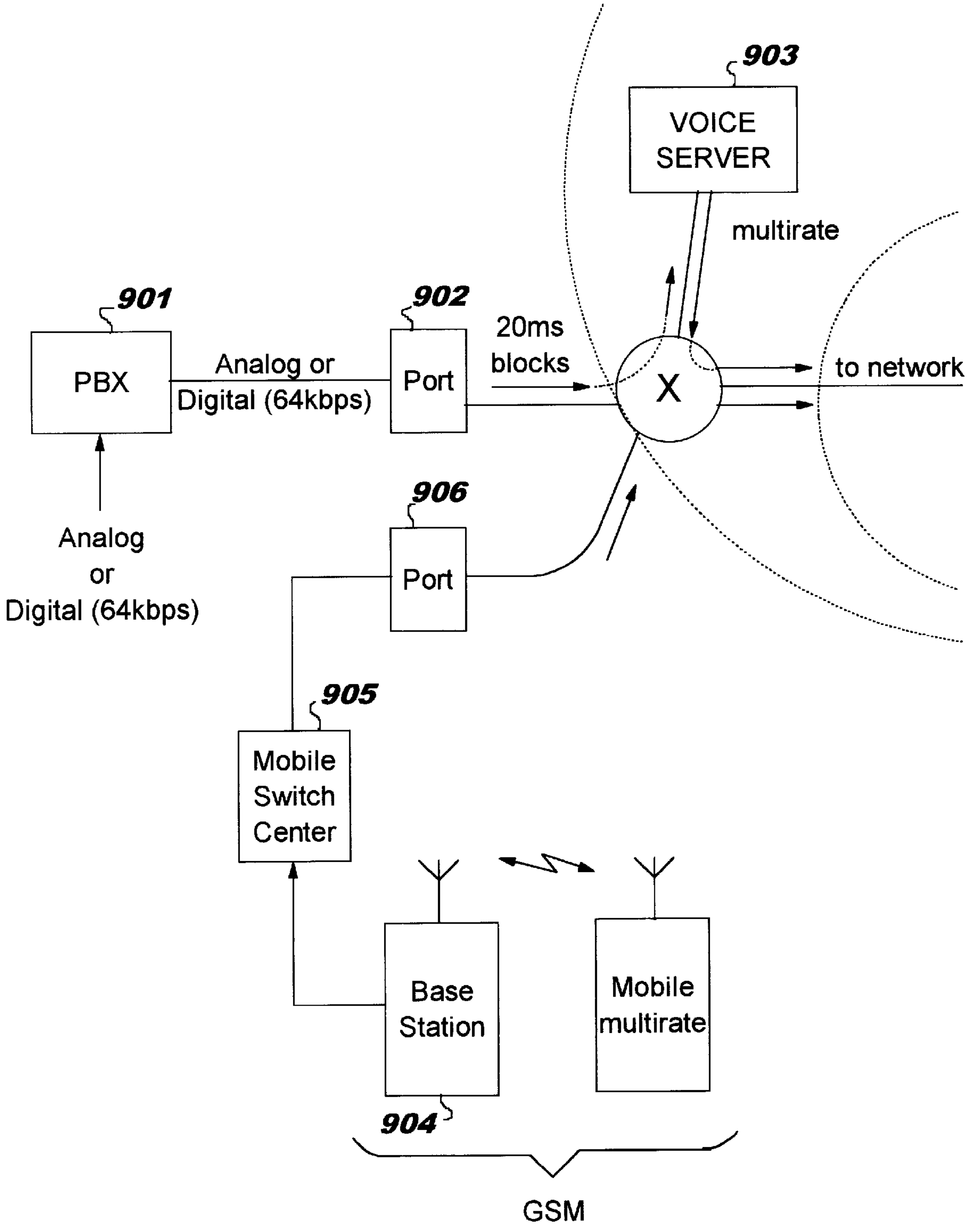
FIG. 9 illustrates the invention applied to both PBX traffic and GSM traffic.

Also, as already indicated, the voice signals might be provided by a GSM network. In that case, the speech signal would already be coded and there is no need to go through the Voice Server. The corresponding entry node operation is schematically represented with more details in FIG. 9, showing both PBX attached system and Mobile Telephone (GSM) attached system. The PBX (e.g. PBX1) is represented in (901) as receiving either analog voice signals or digitized voice data at 64 Kbps. Also, issuing PBX (901) may be either analog signal or digital data at 64 Kbps. The PBX is connected to a network port (902) wherein analog signals received would be digitally encoded at 64 Kbps. Then the 64 Kbps flow is conventionally packetized into 20 ms long blocks (e.g. including 160 bytes). These blocks are switched into the entry node towards the Voice Server (903) for multirate encoding and then back to switch and down towards the selected network path as already explained with reference to FIG. 6. But as per the GSM traffic collected by a considered Base Station (904) it is forwarded toward a Mobile Switch Center (905) attached to the network via a Port 906. Since the signal is already coded as required, then no need to go through a Voice Server. It is directly launched onto the selected network path. But to benefit from the coding scheme of this invention, the conventional standardized European GSM coder should be provided with the additional Block Coder coding (r(n)–r'(n)) into Z(I), as well as corresponding Block Decoder (in the receiving device). Once this is set, then several procedures might be considered. For instance, one may imagine the GSM Server Company defining different price rates. Then, prior to establishing a connection, the mobile telephone user would select a rate (e.g.: 12 or 28 Kbps) for the connection to be set-up. In case of the lowest rate being selected, the Block Coder operating over (r(n)–r'(n)) would be set-off and only green tagged packets provided to the network. But in case the higher rate (i.e. 28 Kbps) be selected by the mobile telephone user, it should be understood that said rate would not be guaranteed. Then the system would operate as described with possible random discarding of red tagged packets during the call. In that case, the GSM "type" terminal receiver modified as described with reference to FIG. 4 would automatically adjust, as indicated above, to the randomly fluctuating transmission rate.

A person skilled in the Art will undoubtedly appreciate the convenience of the voice coding as disclosed herein, which coding enables optimizing existing network operation in terms of network bandwidth occupation by allowing, whenever suitable, random switching of transmission rate in any network node along a set-up voice path, while ensuring optimal quality to the transmitted voice signal.

What is claimed is:

1. A system for optimizing bandwidth in a High Speed Packet Switching Network, said system including a multirate voice coder including a first low bit rate coder section providing first coded sub-frames and a second coder section providing second coded sub-frames, said multirate coder including:

said first coder section including: means for sampling the original voice signal and PCM encoding said sampled signal to derive therefrom PCM encoded samples S(n); means for feeding said S(n) data into short term filtering means (31) tuned by coefficients derived through so-called partial auto-correlation operations performed (30) over said S(n) to provide a short term residual signal r(n); a Long Term Prediction (LTP) loop (32, 33, 37) tuned by long term delay prediction coefficients derived from r(n) (34) and providing a signal e"(n) representing a Long term Prediction residual signal derived from a synthesized short term residual r'(n) and subtractor (35) for subtracting said e"(n) from r(n) to generate a Long Term error residual signal e(n), and first Block Coder means (39) for coding fixed length blocks of e(n) samples into sub-sampled blocks; and, multiplexor for multiplexing said coded fixed length blocks of e(n) wherein said partial auto-correlation, derived coefficients and said long term delay prediction coefficients are placed into said first sub-frame;

said second coder section including: an adder for generating (r(n)–r'(n)) (36) and for feeding said (r(n)–r'(n)) into a second Block Coder 38 to generate said second sub-frame; and means for concatenating each said second sub-frames to the first sub-frame to generate said multirate coded frame at the highest predefined rate;

wherein switching the multirate voice coder output rate from said highest predefined rate to said lowest rate needs only dropping said concatenated second sub-frame from said multirate frame.

2. A system according to claim 1 wherein said multirate voice coder is further characterized in that said first Block Coder (39) includes a so-called Regular Pulse Excited (RPE) coder.

3. A system according to claim 1 wherein said multirate voice coder is further characterized in that said first Block Coder (39) includes a so-called Code Excited Linear Predictive (CELP) coder.

4. A system according to claim 1 wherein said multirate voice coder is further characterized in that said first Block Coder (39) includes a so-called Multi Pulse Excited (MPE) coder.

5. A system according to claim 1 wherein said multirate voice coder is attached to a high speed packet switching network including so-called network nodes (106 through 113) interconnected by high speed links, and is used therein for optimizing link bandwidth by enabling switching said multirate voice coded data from higher rate to lower rate in anyone of the network nodes in case of congestion being detected therein.

6. A system according to claim 5 wherein said data switching from higher rate to lower rate is performed by splitting both coded sub-frames into data packets while tagging differently the packets deriving from said first sub-frames from those deriving from said second sub-frames whereby said rate switching can be operated in any network node on said tagging bases.

7. A system according to claim 6 wherein said sub-frames are split into so-called packets and the different taggings are performed by tagging those packets deriving from said first sub-frames as non-discardable packets while the packets deriving from the second sub-frames are tagged as discardable packets whereby said rate switching is operated over said discardable tagged packets.

8. A system according to claim 6 or 7 wherein said multirate coder is used for coding the voice traffic provided by a Private Branch eXchange (PBX) to a network node, by being located into a so-called Voice Server attached to said network node.

9. A system according to claims 6 or 7 wherein said multirate coder is used for coding the voice traffic provided by a Central Switching system (CX) to a network node, by being located into a so-called Voice Server attached to said network node.

10. A system according to claim 8 wherein said Voice Server is fed with fixed length PCM encoded voice data via a port attached to said network node.

11. A system according to claim 6 wherein said multirate voice coder is used to code Global System for Mobile Telephone (GSM) traffic provided to said high speed digital network via a so-called Mobile Switch Center attached to a network node.

12. A system according to claim 6 wherein said multirate voice coder is located within the portable unit of a mobile telephone system.

13. A system for optimizing bandwidth in a high speed packet switching network including:

a voice coder including a first coder section providing rst coded sub-frames at a first bit rate and a second coder section providing second coded sub-frames at a second bit rate;

concatenator concatenating the first coded sub-frame and the second coded sub-frame to generate a multirate coded frame at a predetermined rate; and a packet scheduler analyzing the multirate frame and dropping therefrom only one of the concatenated sub-frames.

14. The system of claim 13 wherein the first bit rate and the second bit rate are different.

15. The system of claims 13 or 14 wherein the predetermined bit rate is substantially the same as one of the first bit rate and the second bit rate.

16. The system of claims 13 or 14 wherein the first bit rate is lower than the second bit rate.

17. A method for optimizing bandwidth in a high speed packet switching network including the acts of:

generating with multirate voice coder first coded sub-frames at a first bit rate and second coded sub-frames at a second bit rate;

concatenating the first coded sub-frames and the second coded sub-frames to generate a multirate coded frame at a predetermined bit rate; and switching an output of said multirate voice coder by dropping only one of the concatenated sub-frames from the multirate coded frame.

* * * * *